July 30, 1935.  C. E. GRIST  2,009,691

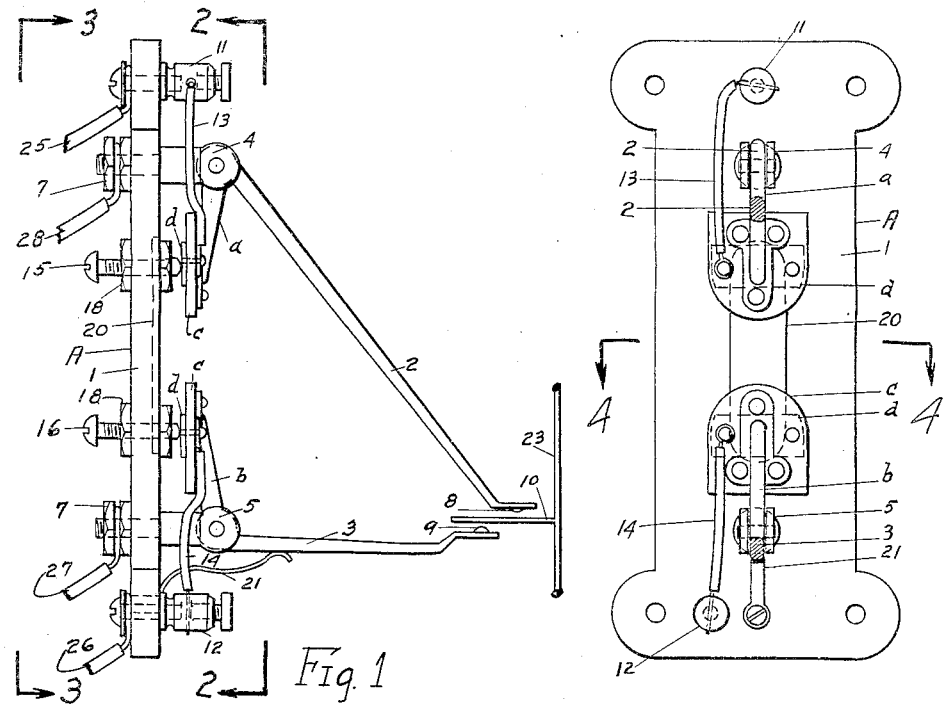
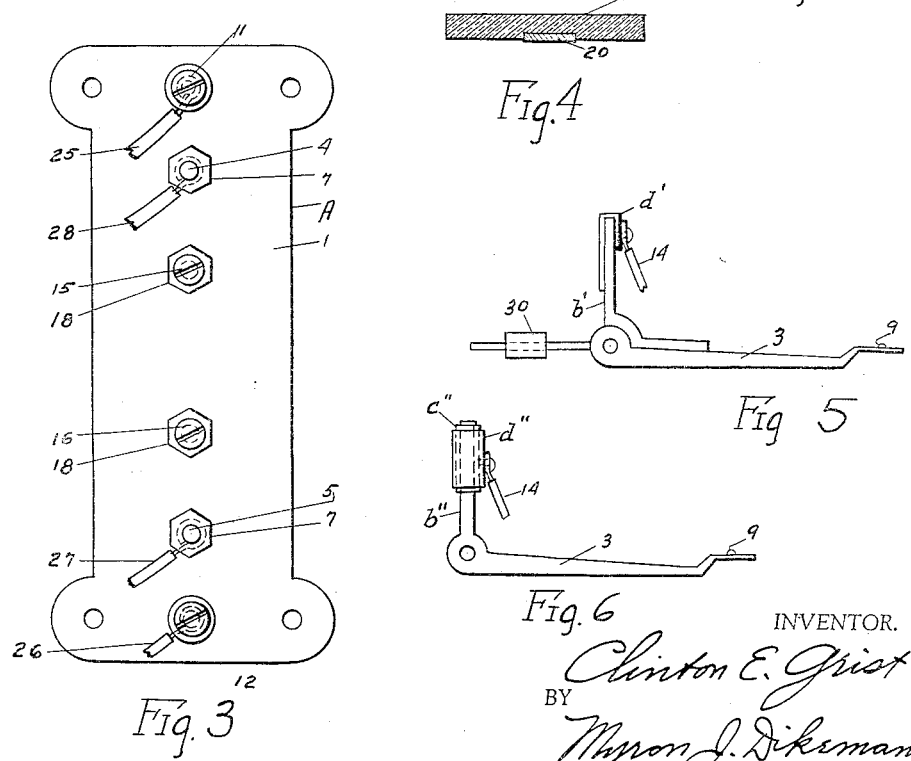

SCALE SIGNAL LIGHT DEVICE

Filed Nov. 18, 1933  3 Sheets-Sheet 2

INVENTOR.
Clinton E. Grist
BY
Myron J. Dikeman
ATTORNEY.

July 30, 1935.  C. E. GRIST  2,009,691

SCALE SIGNAL LIGHT DEVICE

Filed Nov. 18, 1933  3 Sheets-Sheet 3

INVENTOR.
Clinton E. Grist
BY Myron J. Dikeman
ATTORNEY.

Patented July 30, 1935

2,009,691

UNITED STATES PATENT OFFICE 2,009,691

SCALE SIGNAL LIGHT DEVICE

Clinton E. Grist, Detroit, Mich.

Application November 18, 1933, Serial No. 698,617

4 Claims. (Cl. 177—311)

The object of my invention is to produce automatic electric signal means for indicating the weighing positions of a scale beam during any weighing operation, and without observing the beam reading.

Another object is to provide an electric signal device that may be adapted to all types of weighing units or indicators, and will produce different electric signals for each different scale beam position as the scale beam fluctuates under the varying loading conditions.

A further object is to produce a scale signal device that will render both visible and audible signals for overweight or underweight positions, and without effecting the scale operations.

A still further object is to produce an automatic electric scale signal device that is simple in construction, easily installed on any scale, operating efficiently therewith and that can be manufactured at a very low cost.

These several objects are attained in the preferred form by the construction and arrangement of parts more fully hereinafter set forth.

Similar parts on all drawings are marked by similar numerals or letters.

Fig. 1 is a side view of the electric contactor unit showing the general arrangement of the operating parts.

Fig. 2 is a sectional or front view of the same unit taken on the line 2—2 of the Fig. 1, with the contact arms cut away, showing the relative position of the terminal and terminal contact members and the intervening circuit connections.

Fig. 3 is a back view of the same unit taken on the line 3—3 of Fig. 1 showing the terminal circuit wire connections.

Fig. 4 is a cross-sectional view taken on the line 4—4 of the Fig. 2 showing the metal contact bar connecting the center terminals together.

Fig. 5 illustrates a modified form of contact arm terminal insulation, and means for balancing the pivoted arm members.

Fig. 6 illustrates a further modified form of arm terminal insulation by cylindrical thimble sections.

Figure 7:
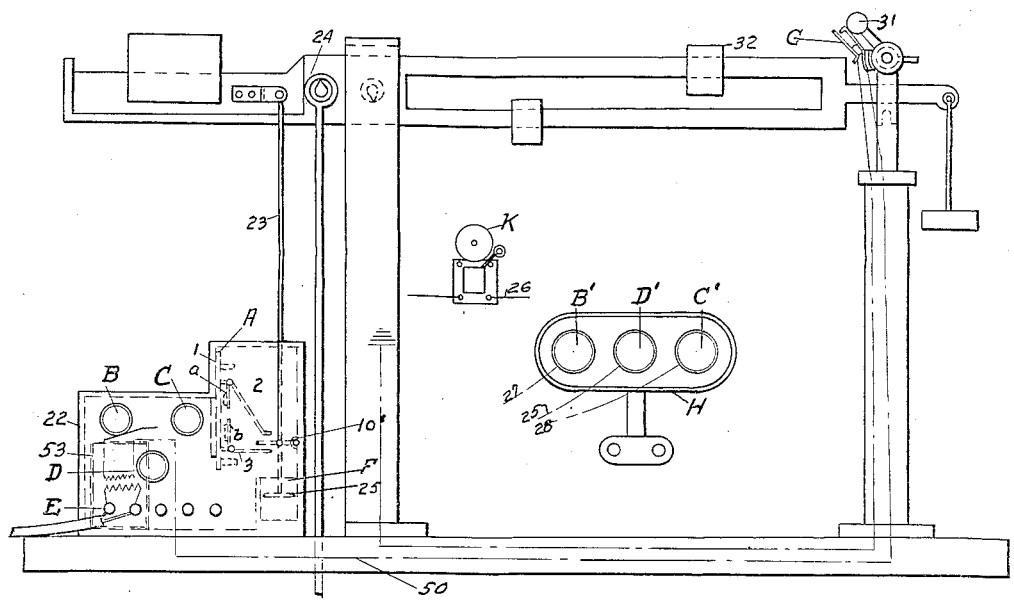
Fig. 7 illustrates the assembled signal device together with the light and bell signal units, as may be mounted on the ordinary beam scale.

While I have illustrated my invention herein as applied to the beam type of scale, it is to be understood that it includes herewith various modifications in both form and arrangement as may be required to adopt the signal device to the different types and kinds of scale and weight registering units.

In general, my invention comprises a multiple electric contactor unit fixedly installed within a suitable casing member, together with various electric signal units and electric transformer, all electrically connected, the casing being suitable for mounting on the scale or weight indicator unit frame, and with the contactor unit operatively connected with some of the scale moving parts, the said electric contactor unit comprising a vertically positioned base block of some suitable insulating material and having separated hinged contact arms mounted thereon in vertical positions, one above the other, each arm being connected in a separate electric light or bell circuit, either of which may be closed by a slight displacement of an intervening operating plate positioned therebetween. Each of said contact arms is provided with an interiorly positioned insulated electric terminal which may form an electric contact with a common terminal unit mounted on the base block, for closing a third signal circuit when the contact arms are not displaced, thus providing separate signals, either visible or audible for all of the scale beam positions.

I will now describe more fully the detailed construction of my device, referring to the drawings and the marks thereon, the preferred form being Figs. 1, 2, and 3.

Figure 8:
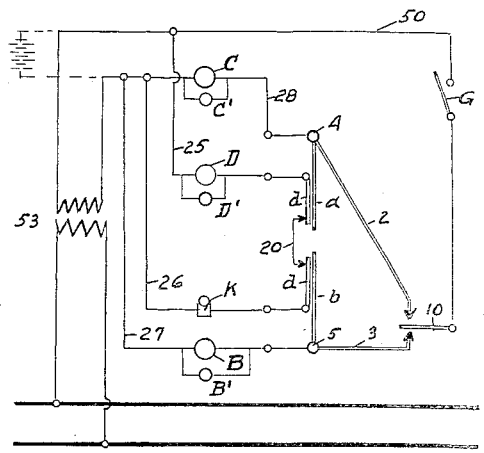
Fig. 8 is a wiring diagram of my device and connected electric signals, for connecting same, operatively with the scale unit, and operated thereby.

The multiple contactor unit A is made of a vertically positioned base block 1 of some suitable insulating material, such as fiber board, or similar materials, and carries mounted thereon two L-shaped contact arms 2 and 3 hingedly mounted thereon by metal contact hinge posts 4 and 5 respectively, said hinged posts being fixedly attached to the base block 1 by the threaded nuts 7. Both the posts and contact arms are positioned vertically, one above the other, the upper arm 2 preferably being elongated and curved downward as illustrated in the Fig. 1 of the drawings, bringing the arm terminals 8 and 9 closely together, although sufficiently separated for inserting an intervening metal operating plate 10 therebetween, and without forming a contact with either arm terminal. The contact operating plate 10 is attached to a vertically positioned operating rod 23 which is connected pivotally with the movable scale beam 24 and grounded in the electric circuit connected therewith, said operating rod being provided with a dash pot disc 25 attached to the lower end thereof. The elongated curved upper arm 2 is especially adapted for an extended displacement where the scale movement is great as in the weightograph or like weight registering units. Both of the contact arms 2 and 3 are movable in the same vertical plane, and are provided with interiorly positioned terminal arms $a$ and $b$, each of said arms being provided with an insulator block $c$ fixedly attached to the under side thereof, and each carry a contact bar $d$ fixedly mounted on said insulator bars completely insulated from the supporting terminal arms $a$ and $b$. Electric circuit terminal posts 11 and 12 are fixedly mounted on the base block 1 adjacent each of the hinge posts 4 and 5, and are provided with flexible circuit wires 13 and 14 connecting said terminal posts to the contact bars $d$ of the respective terminal arms $a$ and $b$. Also within the base block 1, directly beneath each of the two contact bars $d$ are mounted adjusting contact screws 15 and 16, rigidly held in position by the lock nuts 18, and is provided with a metal contact bar 20 connecting the contact adjusting screws together, forming a common central terminal for both contact arm members. The adjusting screws 15 and 16 may be adjusted so as to position the arm terminals 8 and 9 adjacent the operating plate 10 on opposite sides thereof, but without forming contact therewith, and when so adjusted a continuous closed electric circuit is provided between the terminal posts 11 and 12 and their connected circuit wires, but which circuit is broken by any slight displacement of either of the contact arms 2 or 3. A light tension spring 21 is mounted preferably on the base member and engaging the lower contact arm 3 for retaining same in its closed position when otherwise disengaged. The weight of the upper arm 2 when installed in its vertical position is sufficient for retaining its closed position without any spring member. However, if the unit should be installed in a horizontal position a similar light spring member would be required. Fig. 1 of the drawings illustrates the operating plate 10 as fixedly mounted on the operating rod 23, but if a more sensitive adjustment is desired, a hingedly mounted plate 10′ may be pivotally attached to the operating rod 23 as indicated in the Fig. 7 of the drawings, also the contact arms may be provided with a weight balance member 30 as indicated in Fig. 5. The Fig. 5 illustrates a modified form of insulating the terminal $d'$, where the terminal arm $b'$ is made of insulating material and fixedly attached direct to the contact arm. Fig. 6 illustrates another modification of insulating the terminal $d''$, having a thimble $c''$ forced over the arm end $b''$ and a metal thimble terminal $d''$ pressed thereon. The type of terminal insulation is not material, and any suitable means may be used. Any suitable casing member 22 may be used, preferably made of metal and rectangular in form such as illustrated in Fig. 7 of the drawings, although its exact size and shape may be varied depending upon the type and kind of scale or weight indicator with which it is to be used. The casing 22 is provided with different colored electric signal lights B, C and D, preferably red, green and amber respectively, although any desired colors may be used therein, also electric wire terminal buttons E, all mounted within the casing walls. A cylindrical dash pot F is provided therein, positioned at one end of the casing near the bottom thereof. A transformer 53 is fixedly mounted within the casing when the electric current source is of high voltage, although said transformer is not required if the signal device is operated direct from a battery alone. Near one end of the casing 22, above and adjacent the dash pot F, is mounted the assembled electric contactor unit A, fixedly attached to the casing wall by screws or otherwise, and with the operating rod 23 and dash pot disc 25 positioned concentric with the axis of the dash pot chamber F, operative therewith, the upper end of the rod 23 being pivotally connected with the movable scale beam 24 as illustrated in the Fig. 7 of the drawings, and the adjustment of the contact arms 2 and 3 are made with the surfaces of the operating plate 10 as heretofore specified, and in the normal balanced position of the scale beam 24, the operating contact plate 10 is free from both arm terminals 8 and 9, and the arm terminals $d$ are closed on their center terminal through the adjusting screws 15 and 16. The electric circuit wires 25, 26, 27 and 28 are connected to the different terminal posts as indicated in the Fig. 3 of the drawings, and the separated circuits leading therethrough to the several signal lights B, C and D of the casing 22 and the corresponding lights B′, C′ and D′ of the light casing H, also the signal bell K, the main circuit wire 50 being grounded through the scale beam 24 and connected operating rod 23 through a connected opening switch G preferably connected to and operated with the toggle bar 31 of the scale beam, all as indicated in the wiring diagram shown in Fig. 8 of the drawings. The signals and electric wirings are so arranged that when the scale beam 24 is in a balanced position, as in Fig. 7, the operating contact plate 10 free from contact with either arm 2 or 3, the circuit through the circuit wires 25 and 26 and connecting terminal posts 11 and 12 leading through the signal bell K and amber lights D and D′ stands closed through the terminal bars $d$ and adjusting screws 15 and 16, thus making both the bell and amber lights operative, indicating a perfect scale balance. On overloading of the scale causing the beam 24 to raise at the outer end thereof and lowering the operating rod 23 and attached contact plate 10, said plate 10 engages and displaces the contact arm 3, disconnecting the bell and amber light circuit, and closing the circuit through arm 3 and connected circuit wire 27 leading through the red signal lights B and B′. Likewise, if the scale beam 24 is moved in the opposite direction by the scale weight 32, the reverse movement of the contact plate 10 takes place and engages and displaces the contact arm 2, disconnecting the bell and amber light as in the former case, and connecting the circuit through the arm 2 and connected circuit wire 28 leading to the green lights C and C'.

Figure 9:
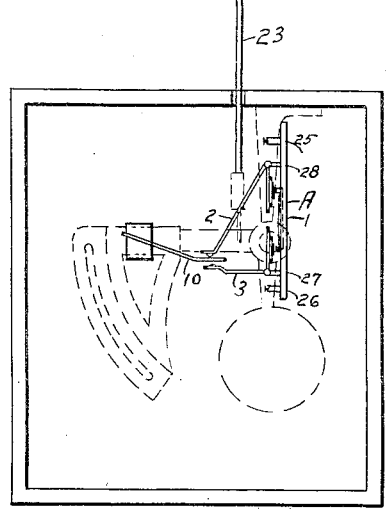
Fig. 9 illustrates my scale signal light device applied to a weightograph, or sensitive weight registering unit, and means for operating same therewith.

My scale signal light device may be installed in any weight indicating unit, such as the weightograph now commonly sold on the market, or any other type of unit adapted for attaching the operating contact plate 10 to some movable operating member mounted therein, as illustrated in Fig. 9 of the drawings, and the operation is the same as heretofore described. In all cases the separated light casing unit H and the electric bell K may be installed in any location desired, independent of the scale or casing positions, the connecting electric wires being extended accordingly.

Figures 10, 11:
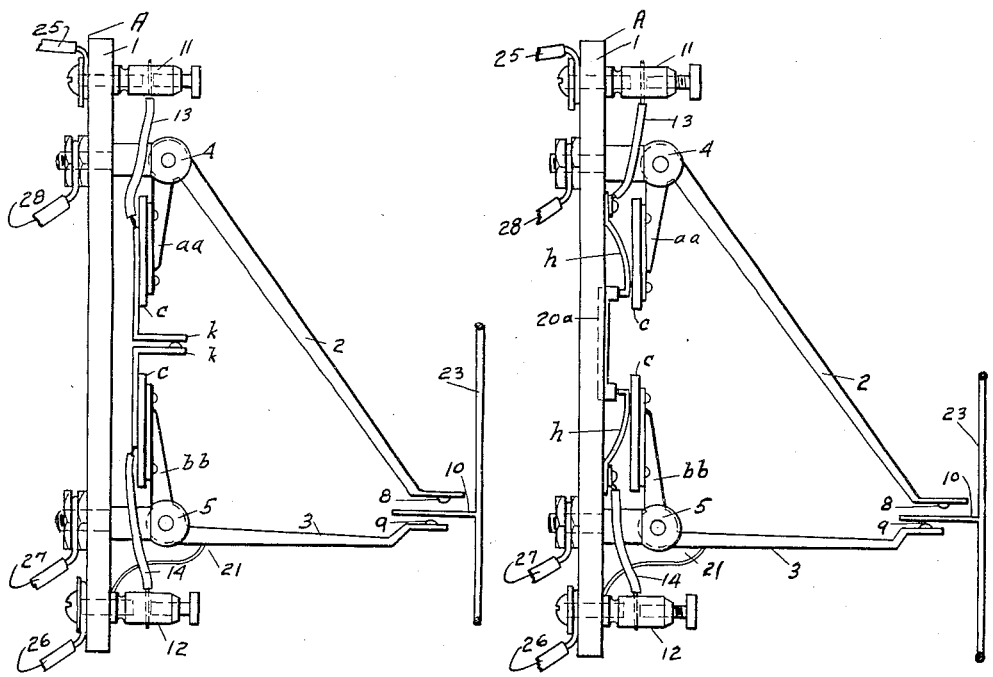
Fig. 10 is a side view of an alternate form of contactor unit shown in Fig. 1, adapting spring arm terminals.
Fig. 11 is a side view of a further alternate form of the same unit, utilizing spring terminals attached to the base, operative by their respective terminal arms.

The Figs. 10 and 11 are modifications of the design shown in Figs. 1 and 2 first herein described, showing alternate means for replacing the central common terminal contact bar 20 used in Figs. 1 and 2, accomplished by use of the spring terminals $h$ attached directly to the base block beneath the arms $aa$ and $bb$ and depressed on the common terminal bar 20$a$ by the insulated arm members, as in Fig. 11, or by use of spring terminals $k$ attached to the respective arm insulator blocks $c$ on the arms $aa$ and $bb$ of the Fig. 10, said spring terminals forming their on contact on closing. The operation is the same as in the former case.

Figure 12:
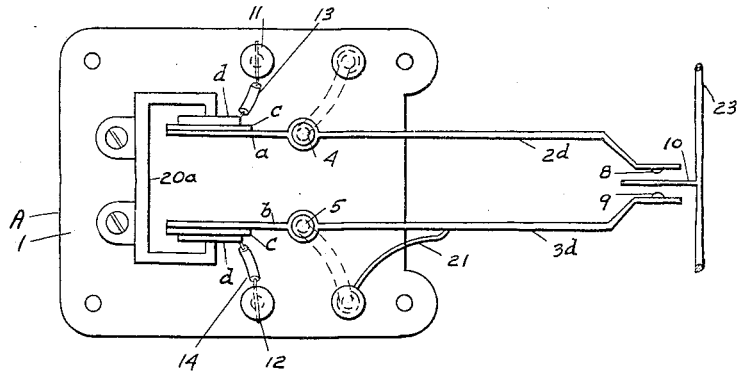
Fig. 12 is also a side view of a modified form of terminal arm, showing straight contact arms pivoted to the base instead of the L-shaped arms used in Figs. 1 and 2.

The Fig. 12 illustrates a further modification of the same unit as shown in the Figs. 1 and 2, but using straight terminal arms 2$d$ and 3$d$ pivoted from the side, instead of the L-shaped arm shown in the former case. The common terminal bar 20$a$ being bent and formed to engage the same end terminal contact blocks in their new positions the same as in the Figs. 1 and 2. The wiring and the operation is the same in all respects.

Having fully described my scale signal light device, what I claim as my invention and desire to secure by Letters Patent is:

1. A scale weighing signal device to be used in combination with a movable scale weighing member, comprising a base block of suitable insulating material and having two oppositely positioned terminal contact arms hingedly mounted thereon, each formed with a terminal extension arm projected from near the hinge section thereof, a terminal contact block mounted on the outer end of each extension arm and insulated therefrom, connecting terminal means mounted thereon capable of engaging electrically both of said contact blocks simultaneously, means mounted thereon for normally retaining both of said contact blocks and supporting extension arms closed on the connecting terminal bar when otherwise disengaged, both of said contact blocks being connected in the same electric signal circuit having electric signal devices mounted therein operative electrically when both contact blocks are closed on the connecting terminal bar, each of said terminal contact arms being connected electrically in separated electric signal circuits having electric signal devices mounted therein, a contact plate movably mounted and interposed between the outer ends of said contact arms and electrically connected in both contact arm circuits, said contact plate also being connected mechanically with a movable scale weighing member and actuated thereby in a manner capable of causing said plate to engage and displace either contact arm thereby opening the extension arm circuit and closing the circuit through the respective contact arms and their connected signal devices as the connected scale weighing member is oscillated.

2. A scale weighing signal device to be used with electric signal devices mounted within electric signal circuits and with a connected scale weighing movable member, comprising a base block of some suitable insulating material and having two L-shaped terminal contact arms formed with a pivot recess at the arm bends hingedly mounted thereon and positioned with the two inner arm extensions adjacent each other and near the base block face, each of said inner arm ends being provided with a separate terminal contact block mounted thereon and insulated therefrom, a common terminal bar mounted on said base block beneath both terminal contact blocks and positioned to engage therewith simultaneously, spring means mounted thereon for retaining the terminal contact arms and attached contact blocks closed on the common terminal bar when otherwise disengaged, a movably mounted contact member interposed between the outer ends of the contact arms, said contact member being provided with a dash pot retarding unit and connected mechanically to a movable scale weighing member capable of moving same to engage and displace either of said contact arms with their respective connected terminal blocks, means mounted on the base block for connecting each of the contact arms electrically within separated electric signal circuits having electric signal devices mounted therein, means mounted thereon for connecting the movably mounted contact member in both of the contact arm signal circuits, and means mounted thereon for connecting both terminal contact blocks in a continuous electric signal circuit through the connecting terminal bar, said circuit having electric signal devices mounted therein.

3. A scale weighing signal device to be used with electric signal units mounted within electric signal circuits and with a movable scale weighing member, comprising a base block of insulating material having two oppositely positioned terminal contact arms formed with a pivot recess therethrough hingedly mounted on said base and positioned thereon with their inner ends adjacent each other, a terminal contact member mounted thereon beneath each inner arm end and insulated therefrom, a common terminal bar mounted on said base block positioned to engage both terminal members simultaneously, means mounted thereon for retaining the terminal contact arms and corresponding terminal members closed on the common terminal bar when otherwise disengaged, a movably mounted contact member interposed between the outer ends of said terminal contact arms and mechanically connected to a movable scale weighing member and in a manner capable of engaging and displacing either of the contact arms as the scale weighing member is oscillated, means mounted on the base block for connecting each of the contact arms electrically within separated electric signal circuits having electric signal devices mounted therein, means mounted thereon for connecting the movably mounted contact member in both contact arm signal circuits, and means mounted thereon for connecting both of the terminal contact members in a continuous signal circuit through the common terminal bar and having electric signal devices mounted therein.

4. An electric contactor unit for a scale weighing signal device to be used in combination with various electric signal unit circuits and a movable scale weighing member, comprising a base block of insulating material having two oppositely positioned terminal contact arms hingedly mounted thereon, each formed with a terminal extension arm projected from near the hinge section thereof, a terminal contact block mounted on the outer end of each extension arm and insulated therefrom, a connecting terminal bar mounted on the base block adjacent the contact blocks, engageable with both of said contact blocks simultaneously, means mounted thereon for normally retaining both of said contact extension arms with attached contact blocks closed on the connecting terminal bar when otherwise disengaged, means mounted thereon for connecting both of said contact blocks in the same electric circuit, operative when both contact blocks are closed on the terminal bar, means mounted thereon for connecting each of said terminal contact arms in separated electric signal unit circuits, a contact plate mounted adjacent said base block and interposed between the outer ends of said contact arms and having means for electrically connecting same in both of the contact arm circuits, and means mounted on said contact plate for mechanically connecting same to a movable scale weighing member.

CLINTON E. GRIST.